United States Patent
Sedore

[11] 3,900,650
[45] Aug. 19, 1975

[54] FIBRILLAR LOCKING SYSTEM

[76] Inventor: James W. Sedore, 11 Jason St., Pittsfield, Mass. 01201

[22] Filed: Feb. 8, 1973

[21] Appl. No.: 330,544

[52] U.S. Cl. .................. 428/86; 264/45; 428/310
[51] Int. Cl..... B32b 5/18; B32b 27/40; B29d 27/00
[58] Field of Search ......... 161/159, 190, 41, 88, 92, 161/93; 264/45

[56] References Cited
UNITED STATES PATENTS

| | | | |
|---|---|---|---|
| 3,282,761 | 11/1966 | Evangelist | 156/249 |
| 3,591,444 | 7/1971 | Hoppe | 264/45 X |
| 3,616,171 | 10/1971 | Hoskinson, Sr. | 264/45 X |

*Primary Examiner*—Philip Dier
*Attorney, Agent, or Firm*—Pollock, Philpitt & Vande Sande

[57] ABSTRACT

A structural panel for use in modular homes is disclosed. The panel employs a sandwich of two fiberglass laminated skins with fibrillar inner surfaces and a froth foam resin interspersed therebetween. Each of the skins is provided with an inner fibrillar surface having a multiplicity of inwardly projecting reinforcing fibers which extend into and interlock with the foam layer. The interlock provided by the fibrillar surface prevents delamination and resultant panel failure.

10 Claims, 2 Drawing Figures

FIBRILLAR LOCKING SYSTEM

BACKGROUND OF THE INVENTION

1. Field of the Invention

The structural panels of the present invention are particularly suitable for use in modular housing. In common practice the modules are built at a central location or factory and then shipped to the job site for assembly. In constructing these modules, it is generally recognized that one of the lightest, strongest, and most durable of construction materials is fiberglass reinforced synthetic resin. The walls of modules constructed with this material are commonly filled with a synthetic polyurethane foam and are light, strong, thermal insulating and still inexpensive. The use of these materials enables the architect and builder to use complex curvatures in the design and construction of the homes. While the structural panel of the present invention is intended for use in homes of this type, it is recognized that its application is suitable for any type of fiberglass sandwich construction, including fiberglass boats, airplanes, and conventional structural panels.

2. Description of Prior Art

In copending application U.S. Ser. No. 209,767 entitled "Modular Building Unit and Methods of Forming Same", now abandoned, a fiberglass sandwich panel construction is employed. Resin skins are formed on the inner and outer surfaces of male and female molds, and then the molds are spaced two to three inches apart. The polyurethane foam is then injected into the space between the molds and cured in place. The male mold is then removed, and the housing module having a sandwich construction is removed from the female mold.

This type of construction has resulted in a module which is light, strong, thermal insulating, and inexpensive. The present invention is an improvement on this type of wall construction and provides for superior lamination characteristics and superior density distribution for the intermediate polyurethane foam.

If liquid non-expanded polyurethane is poured into the mold, it will tend to pool at the lowest points in the mold. As the polyurethane begins to expand and foam, it will block the expansion of the foam between the pool of polyurethane and the open upper extremities of the cavity. As the expanded foam blocks the expansion of the pooled polyurethane, a substantial amount of force will be exerted by the polyurethane as it foams within the confined portion of the cavity. In any area in which the polyurethane has pooled, there will be a substantial increase in the density of the foam after the foaming action has taken place. This results in an uneven foam distribution and an excessive use and waste of polyurethane. It also requires extraordinarily strong molds to prevent the pressure generated by the foaming polyurethane from distorting the skins and mold surfaces. By injecting a pre-expanded froth foam into the cavity, the problems associated with liquid polyurethane are obviated and it is possible to achieve a more uniform density throughout the cavity. In addition, since approximately 80% of the expansion has already taken place, the amount of pressure exerted by the foam as it expands is substantially reduced.

In conventional construction techniques, gas bubbles may form which will cause delamination between the foam and the synthetic resin skins. These bubbles are formed in two ways. They may be formed in the original molding process when excess gas is released by the foaming agent. Alternately, they may be formed by the release of nitrogen gas when the module is exposed to high temperatures. Although the air temperature in southern climates is not excessive, the sun temperature is high enough to cause break down of the foam and release of nitrates into gas bubbles.

SUMMARY OF THE INVENTION

It is therefore an object of the present invention to provide an improved fiberglass sandwich panel having superior lamination characteristics. A fibrillar surface is formed on the inner surfaces of the fiberglass skins. This surface is formed by spraying a mixture of chopped reinforcing fibers and resin on to the fiberglass skin. A reduced amount of resin is used which causes a multiplicity of fibers to stand out and extend away from the resin skin. When the froth foam is poured into the cavity between the two fiberglass skins, the outwardly extending fibers extend into and interlock with the foam and thereby create a superior lamination between the skins and the foam layer.

It is another object of this invention to utilize a preexpanded froth foam polyurethane in the formation of the intermediate foam layer. This prevents uneven foam densities, and assists in the interlocking of the foam and fibril resin skins. Additionally, with the use of a preexpanded froth foam, a lighter weight mold cavity may be employed thereby reducing the cost for the mold itself.

It is another object of this invention to provide an aluminium oxide thermal barrier in the outer skin of the fiberglass laminate panel to prevent an excessive heat build up within the laminate caused by high sun temperatures. By reducing the temperature generated by the solar load, the tendency to form gas bubbles is thereby reduced, and the possibililty of delamination resulting from the gas bubbles is thereby reduced.

DESCRIPTION OF THE PREFERRED EMBODIMENT

Figure 2:
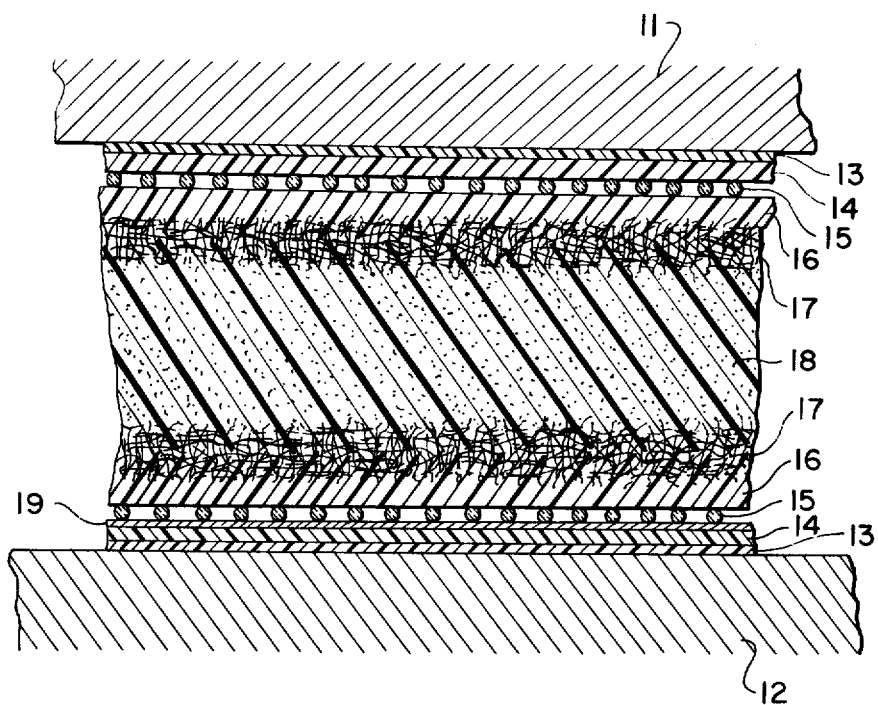
FIG. 2 is a cross-sectional view of the structural panel formed in accordance with the present invention.
Figure 1:
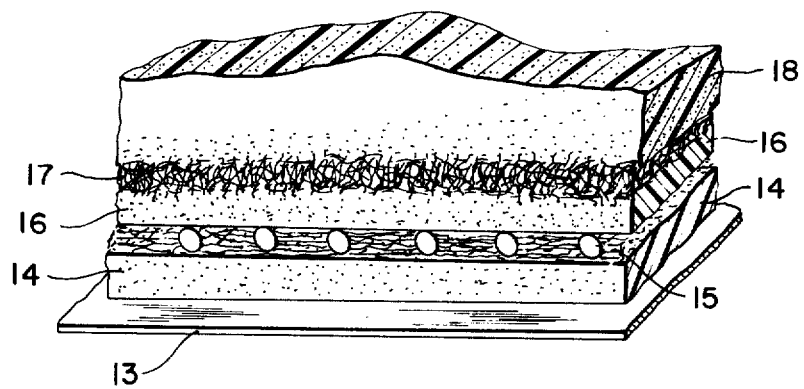
FIG. 1 is an isometric cut away view of one of the fiberglass skins illustrating layer by layer the construction of the skin.

The structural panel illustrated in FIGS. 1 and 2 is intended for use in a light weight inexpensive fiberglass housing module. It is to be understood however that the same construction technique, and resultant panel would be equally applicable to any fiberglass molded construction including fiberglass boats and airplanes. Additionally, it would find use in conventional fiberglass structural panels used in conventional building structures.

Referring to FIG. 2, the panel is shown in place between an inner or male mold 11 and an outer or female mold 12. In the fabrication of the panel, the outer gel coat indicated by numeral 13 in FIG. 1 is first applied to the outer surface of the male mold cavity and the inner surface of the female mold cavity. This gel coat is a pigmented isophthalic polyester resin and is usually 15 to 20 mils in thickness. The gel coat provides the decorative surface for the panel when desired. The use of a gel coat is not mandatory, but is employed wherever the panel surface is to be exposed to view.

After the application of the gel coat a layer 14 of non-pigmented synthetic resin is applied. This resin is a self-extinguishing fire-retardant pre-accelerated thixotropic resin yielding a tacky bonding surface. Preferably the resin will provide a tacky surface having a characteristic under the Barcol hardness test of 20 to 30 as compared to a normal polyester resin test for cured laminate having a value of 40 to 70. Before the layer of resin 14 is cured, a reinforcing mat or web 15 is applied to the resin and mopped or rolled into place. An additional coat of resin is applied over the mat 15 to thoroughly bond it and the coats or layers of resin into an outer laminate resin layer. Web 15 is preferably a fiberglass mat, although it may be constructed of rayon, polypropylene, or other reinforcing fibers. In conventional construction, it is normal to use a fiberglass web weighing approximately 2 ¼ ounces per square foot. In the new and improved version having the fibrous bonding surface, it is possible to use a fiberglass mat having a weight of only 1 ½ ounces per square foot, and have the strength characteristics of a laminated panel using a 2 ¼ ounce mat.

After the resin layer 14 has been applied and the fiberglass mat 15 has been saturated, an inner layer 16 is sprayed on with a fiberglass chopper. This inner layer 16 is a mixture of chopped fiberglass and resin having a ratio of about 40% fiberglass and 60% polyester resin. In normal fiberglass applications, a ratio of about 80% resin to 20% fiberglass is used. By drawing out the mixture to about 60% resin, and applying approximately three-quarters of an ounce per square foot of chopped fiberglass, a fibrillar surface 17 is formed on inner layer 16 which has a multiplicity of strands extending outwardly from the inner layer 16. Panels have been constructed using chopped fiberglass fibers ranging from three-quarter inch in length to 3 inches in length, but it is found that it is preferable to use fibers which are chopped to approximately 1 ½ inches in length. Again the fibers in the preferred embodiment are fiberglass, but may be rayon, polypropylene, or boron-glass.

The fibrillar surface 17 is created by applying a hard silane binder to the chopped roving strands as they are blown with the resin against the laminate layer. Silane is a compound of silicon and hydrogen, and other monomeric silicon compounds which have the ability to bond glass to organic resins. The chopping gun and blower are well known in the art. When inch-and-a-half fibers are used, it is found that there will be a minimum protrusion of the fibers of approximately one-eighth of an inch, with many of the fibers extending upwardly a half inch or more at completely random angles and orientations. This completely random pattern enables the froth foam to fill the interstices between the fibers and securely interlock the foam layer with the fibrillar surface 17. This provides a reinforced joint line between the foam and skin that can withstand much greater temperature variations and structural stress loads than the conventional construction.

The resin used in forming the fibrillar surface 17 is a pre-accelerated resin providing a combination of fast "web-out" and rigid cure when used with catalyst injection spray-up equipment. The room temperature gel and cure data using different levels of catalyst are shown in Graph I. It illustrates different levels of methyl ethyl keytone catalyst as a 60% solution in dimethyl phthalate. The cure data was compiled on tests of a ⅛ inch thick laminate panel.

GRAPH I

Room Temperature Gel and Cure Data

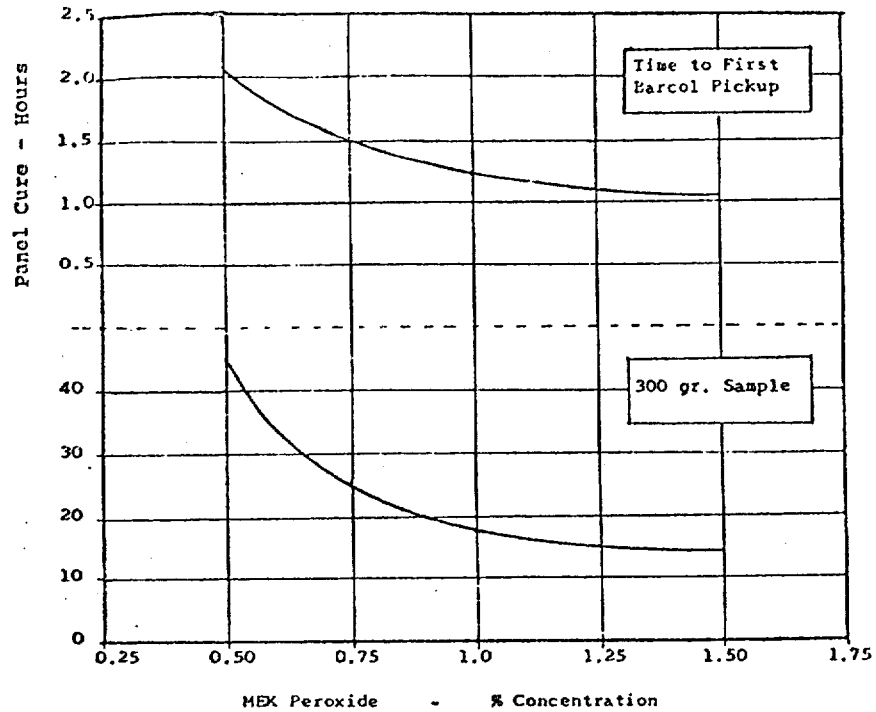

MEK Peroxide - % Concentration

The above-described process is repeated for both the female and male molds so that each has formed thereon a gel coat 13, a resin layer 14, a reinforcing web 15, an inner layer 16 and a chopped fiberglass fibrillar surface 17.

It is also possible to provide a laminate heat reflector shield within the panel to prevent excessive heat build up generated by solar load. As mentioned previously, the sun temperature generated in southern climates can cause a breakdown of the foam, and a release of nitrates which form nitrogen gas bubbles between the foam and the resin layer. As illustrated in FIG. 2, a heat reflector shield 19 may be formed by applying a 5 mil layer of aluminum oxide powder to the tacky laminate resin layer 14 before the chopped fiber and resin layer 16 is sprayed onto the mold. The aluminum oxide is applied under pressure and sealed between the resin layer 14 and the mat or web 15 as the resin cures. This shield will resist heat penetration from exterior sun load and provide a barrier between the foam and the outside skin. Normal internal temperatures formed from the sun load will run in excess of 120° without the heat shield, but will be reduced to approximately 90° by using the aluminum oxide layer.

After the fiberglass skins have been formed, the molds 11 and 12 are brought into close proximity as illustrated in FIG. 2 for the foaming operation. The distance maintained between the molds 11 and 12 may vary from approximately one-half inch to several inches but in the panels used in modular homes it is normally established at three inches. As described in copending application U.S. Ser. No. 209,767 entitled "Modular Building Unit and Methods of Forming Same", the male mold is inverted and suspended over the female mold to form a semi-circular cavity between the two fiberglass skins. After the mold surfaces 11 and 12 are secured in place, the polyurethane foam 18 is poured or frothed in place. As was pointed out previously, when liquid polyurethane is used, some of the liquid will tend to pool at low points in the mold cavity. Once the liquid pools, it may become isolated from the open end of the cavity by foam which has already expanded and closed the cavity. Once this situation occurs, the remaining liquid foam is forced to foam within a confined space. This foaming, which occurs by chemical reaction, generates substantial pressure and requires exceedingly strong molds 11 and 12.

When froth foam is used, substantially less pressure is generated between the cavities since the foam is already 80% pre-expanded In using a froth foam, it is possible to achieve a foam density throughout the entire cavity of 1.9 to 2.2 pounds per square foot. In using a liquid polyurethane foam, it is not uncommon to find foam densities ranging as high as 5.5 pounds per square foot wherever the liquid foam has pooled. This uniform density also results in a significant saving in the amount of foam required for each module. In using a liquid foam, the process requires approximately 320 pounds of polyurethane foam for each module, while when using a froth foam, only 210 pounds of foam are required for each module. Additionally, since the pressure exerted on the mold surfaces 11 and 12 is significantly less when using a froth foam, it is possible to use much lighter weight and more inexpensive mold cavities which substantially reduces the cost of the process.

In the preferred form of the embodiment, approximately 3 inches of 2 pounds per cubic foot density polyurethane fire-retardant foam is frothed into the mold cavity. Polyurethane is used as it is found that it yields superior insulating properties. Polyurethane foam has a thermal conductivity or "K" factor of 0.13 btu per hour per square foot per degree of Fahrenheit. Polyurethane foam used in this manner is three times more effective as insulating material than fiberglass insulation. The heat loss in a module formed from the structural panel described herein is approximately one-tenth of 1° per hour as compared to 4° per hour of heat loss for a brick house at the same temperature differential. This results in tremendous savings in heating and cooling cost to the home owner.

It has also been found in constructing the module that the fiberglass mat 15 may be eliminated, and the entire outer resin layers 14 and 16 may be constructed with the chopped fiber-resin mixture. While the use of the fiberglass web 15 greatly increases the strength of the laminate, it has been found that the use of the chopped fibers only will provide a laminate structure as strong as that previously provided with conventional non-fibrous surfaces and conventionally poured polyurethane foam. If a chopped fiber and resin mixture is applied to the gel coat 13 with a density of approximately three-quarter ounce of chopped fiber per square foot, it is found that the resultant structural panel with the fibrillar surface and froth foam interior will be equivalent in strength to a conventional panel formed with 2.2 ounces of fiberglass per square foot and conventionally poured polyurethane foam. This not only results in a savings of fiberglass, but also a substantial reduction in the amount of resin required since the resin to fiberglass ratio is reduced from 80% resin: 20% fiberglass to 60% resin: 40% fiberlgass. When the froth foam is used, the density is maintained at approximately 2 pounds per cubic foot and the amount of polyurethane foam required is also substantially reduced. Thus it is possible to build a structural panel with much less material but retain the same strength characteristics, and provide for increased delamination resistance. A module formed from the structural panel has been tested to withstand hurricane winds of 150 miles an hour and snow loads of up to 40 feet. It is completely impervious to insect damage, corrosion, mildew, and most chemicals, and since it is manufactured of fire-retardant materials, it is virtually fireproof. Since the gel coat is pigmented, the module requires no painting or other cosmetic finishing.

While specific compounds and mixtures have been illustrated and described, and specific examples given herein, it is to be understood that various modifications of the panel and the cooperation between the various binders and resins would occur to one skilled in the art. For example, it would be possible to provide an admixture of polypropylene and fiberglass fibers in the chopped fiberglass-resin layer and still provide the same strength characteristics. Similarly, it would be possible to use a fiberglass mat, and polypropylene fibers, or a rayon mat and chopped fiberglass fibers. Similarly, epoxy resins could be substituted for the polyester resin. Accordingly, it is to be understood that the present invention is not limited to these illustrations and examples, but is to be limited only in accordance with the appended claims.

I claim:

1. A laminated sandwich panel comprising:

a first outer laminate resin layer;

a first inner layer bonded at an outer surface thereof to said outer laminate resin layer, said first inner layer comprising a mixture of resin and a sufficient quantity of chopped fibers per unit area of said first inner layer to form a fibrillar surface of a multiplicity of said fibers extending from the inner surface of said first inner layer; and a layer of foamed synthetic resin bonded on one surface to said first inner layer with said extending fibers of said first inner layer interlocking with said layer of foamed synthetic resin.

2. A panel as claimed in claim 1, further comprising:

a second outer laminate resin layer;

a second inner layer identical to said first inner layer and bonded to the other surface of said layer of foamed synthetic resin and to said second outer laminate resin layer, with the extending fibers of said second inner layer interlocking with said layer of foamed synthetic resin.

3. A panel as claimed in claim 1, wherein said first inner layer comprises approximately 60% by weight of resin and 40% by weight of chopped fibers.

4. A panel as claimed in claim 3, wherein said first inner layer comprises a silane binder applied to said chopped fibers.

5. A panel as claimed in claim 1, wherein said chopped fibers are selected from the group consisting of fiberglass, rayon, polypropylene and boron-glass.

6. A panel as claimed in claim 1, further comprising a layer of aluminum oxide powder disposed between said first outer laminate resin layer and said first inner layer.

7. A panel as claimed in claim 1, wherein said first outer laminate resin layer comprises a reinforcing mat disposed between two resin layers.

8. A panel as claimed in claim 1, wherein the outer surface of said first outer laminate resin layer additionally is provided with a gel coat.

9. A panel as claimed in claim 7, wherein said mat comprises fiberglass strands and weighs approximately three-fourths ounce per square foot.

10. A panel as claimed in claim 1, wherein said foamed synthetic resin is a rigid polyurethane foam having a density of approximately 2 pounds per cubic foot.

* * * * *

Notice of Adverse Decision in Interference

In Interference No. 99,314, involving Patent No. 3,900,650, J. W. Sedore, FIBRILLAR LOCKING SYSTEM, final judgment adverse to the patentee was rendered Apr. 28, 1977, as to claims 1, 2, 5, 8 and 10.

[*Official Gazette August 2, 1977.*]